United States Patent [19]

Sawamura

[11] 4,289,053
[45] Sep. 15, 1981

[54] DEVIATION DETECTING APPARATUS FOR A BANDSAW BLADE FOR HORIZONTAL BANDSAW MACHINES

[75] Inventor: Mitsuyoshi Sawamura, Kobe, Japan

[73] Assignee: Amada Company, Limited, Tokyo, Japan

[21] Appl. No.: 76,501

[22] Filed: Sep. 17, 1979

[30] Foreign Application Priority Data

Sep. 16, 1978 [JP] Japan .............................. 53-112896

[51] Int. Cl.³ ...................... B23D 53/00; B23D 59/00
[52] U.S. Cl. ..................................... 83/62.1; 83/522
[58] Field of Search ................... 83/62.1, 62, 74, 522

[56] References Cited

U.S. PATENT DOCUMENTS 2,914,102  11/1959  Linholm ................................ 83/74

Primary Examiner—J. M. Meister
Attorney, Agent, or Firm—Thompson, Birch, Gauthier & Samuels

[57] ABSTRACT

A deviation detecting apparatus for a bandsaw blade in a bandsaw machine has an arm pivotally mounted at a location adjacent to the linear path of travel of the blade through the cutting zone. The arm is yieldably urged into slidable contact with one side of the blade, and is thus pivotally movable in response to lateral deviations of the blade. A control device is responsive to pivotal movement of the arm. The control device generates a control signal indicative of blade deviations.

4 Claims, 3 Drawing Figures

U.S. Patent  Sep. 15, 1981  4,289,053
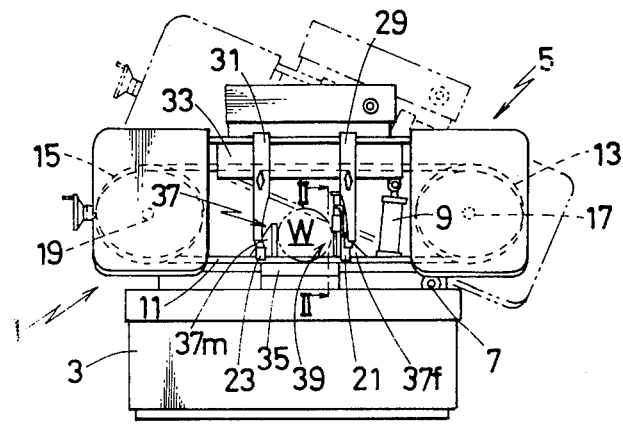
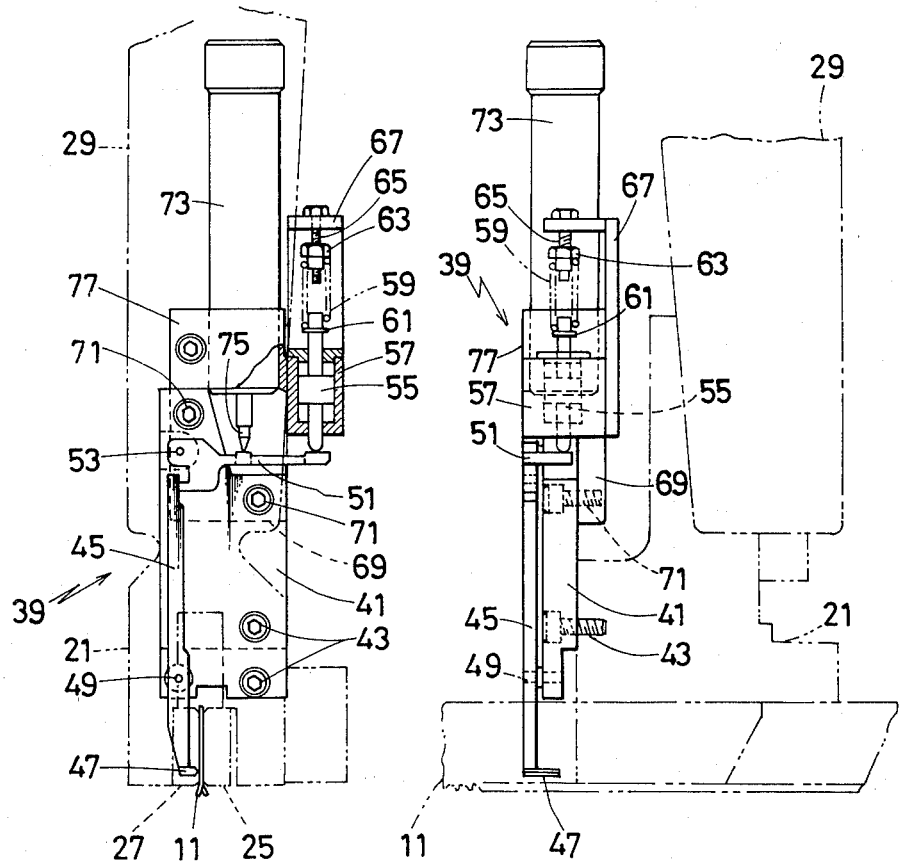
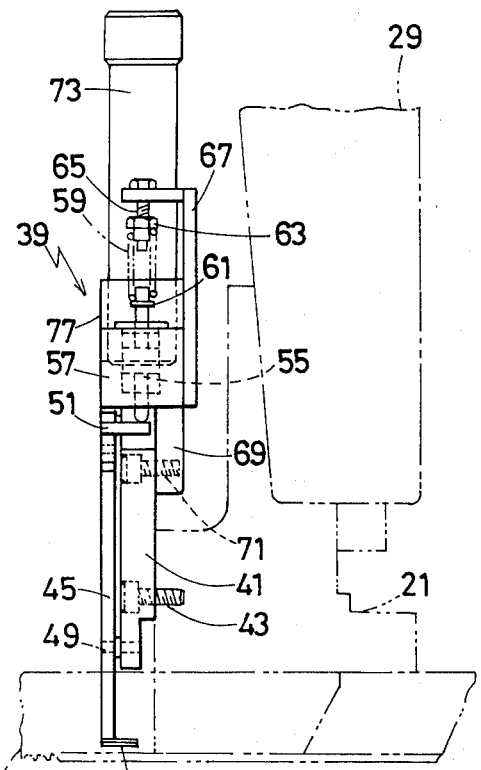

DEVIATION DETECTING APPARATUS FOR A BANDSAW BLADE FOR HORIZONTAL BANDSAW MACHINES

BACKGROUND OF THE INVENTION

1. Field of the Invention

The present invention relates generally to horizontal bandsaw machines having a flexible endless bandsaw blade trained around a plurality of wheels or pulleys to perform cutting operations and, more particularly, pertains to apparatus for detecting deviations of the bandsaw blade from the desired line of cut in horizontal bandsaw machines.

2. Descripton of the Prior Art

As is well known, horizontal bandsaw machines comprise a base on which workpieces to be cut are placed and held and a saw head assembly in which a flexible endless bandsaw blade is trained around a pair of wheels or pulleys, one of which is driven. Usually, the bandsaw blade is slidably held and guided by a pair of guide means at the cutting zone where cutting operations are to be made. The saw head assembly is so arranged as to be lowered and raised toward and away from the base by a suitable means such as a hydraulic motor, with movement of the head assembly either being pivotal around a hinge pin or vertical along appropriate vertical guide means. Thus, in cutting operations, the saw head assembly is lowered toward the base from its raised position so as to enable the driven bandsaw blade to cut the workpieces which have been placed on the base. Also, in automatic horizontal bandsaw machines, there are provided arrangements for automatically raising and lowering the saw head assembly and automatically feeding the workpieces into the cutting zone after completion of each cutting cycle.

One difficulty which has been encountered with conventional horizontal bandsaw machines of the above described type is that because the bandsaw blade is flexible, it will often deviate or vary laterally out from the desired line of cut to be made on the workpiece, even though it is guided by the guide means at the cutting zone. Particularly, the bandsaw blade has a tendency to laterally deviate as it becomes worn and especially when cutting difficult-to-cut materials such as stainless steels, heat-resisting steels and anticorrosion alloys. Such deviations of the bandsaw blade adversely affect cutting accuracy which in extreme cases necessitates scrapping of the workpiece. Since the deviations of the bandsaw blade cannot be readily noticed during cutting operations, it has often occurred that a number of scrap pieces are automatically and continuously produced from high-priced materials in automatic horizontal bandsaw machines. For these reasons, there has been a great need, heretofore unfullfilled, for a means to immediately and automatically detect the deviations of the bandsaw blade, especially in automatic horizontal bandsaw machines, without requiring constant attention by the saw operator.

SUMMARY OF THE INVENTION

It is an object of the present invention to provide an apparatus for detecting deviations of the bandsaw blade from its proper course, namely the desired line of cut to be made on workpieces during cutting operations in horizontal bandsaw machines.

It is another object of the present invention to provide an apparatus for detecting bandsaw blade deviations from the proper line of cut and simultaneously stopping the blade.

It is a further object of the present invention to provide an apparatus responsive to bandsaw blade deviation for automatically stopping the blade after a selectively predetermined degree of deviation has occurred.

These objects can be accomplished by providing a horizontal bandsaw machine with a detecting means which is kept in contact with one of the sides of the bandsaw blade and is connected with an actuating means which can stop the bandsaw blade when it has deviated an amount which is selectively predetermined.

Other and further objects and advantages of the present invention will be apparent from the following description and accompanying drawings which, by way of illustration, show a preferred embodiment of the present invention and the principle thereof.

BRIEF DESCRIPTION OF THE DRAWINGS

FIG. 1 is a front elevational view of a horizontal bandsaw machine embodying the principles of the present invention.

FIG. 2 is a partial view showing partially in section a portion of the horizontal bandsaw machine shown in FIG. 1 as viewed substantially along the line II—II of FIG. 1.

FIG. 3 is a partial view showing the same portion as that shown in FIG. 2 as viewed from the right-hand direction in FIG. 2.

DESCRIPTION OF THE PREFERRED EMBODIMENTS

Referring now to FIG. 1, there is shown a horizontal bandsaw machine which is generally designated by the numeral 1 and comprises a box-like base 3 and a saw head assembly 5 vertically movable toward and away from the base 3 as is conventional. The saw head assembly 5 is pivotally connected to the base 3 by means of a hinge pin 7. The saw head assembly is raised and lowered by a hydraulic motor 9 of the piston-cylinder type. In the saw head assembly 5, a flexible endless bandsaw blade 11 is trained around a pair of driving and driven wheels 13 and 15 having shafts 17 and 19, respectively. Wheel 13 is driven by conventional means. At the cutting zone, the bandsaw blade is slidably held or guided with its cutting edge faced vertically downwardly by a pair of guide assemblies 21 and 23, each having a pair of guide members 25 and 27 between which the bandsaw blade 11 is slidingly passed as shown in FIG. 2. The guide assemblies 21 and 23 are detachably fixed or integrally provided at lower ends of depending arm members 29 and 31, respectively, which are adjustably held by a beam member 33 fixed at the upper portion of the saw head assembly 5. Also, a work-table 35 is mounted at the cutting zone on the base 3 so that a workpiece W may be placed thereon, and a vise assembly 37 having a fixed jaw 37f and a movable jaw 37m is also mounted on the base 3 to hold the workpiece W to be cut therebetween. Thus, when the saw head assembly 5 is swung down around the hinge pin 7 from its raised position shown by the imaginary lines in FIG. 1, the bandsaw blade 11 rotating around the driving and driven wheels 13 and 15 in the saw head assembly 5 will be fed to cut the workpiece W held by the vise assembly 37 on the work-table 35. Also, the horizontal bandsaw machine 1 may be so arranged that the saw head assembly 5 can be automatically raised and lowered for each cutting cycle and may be provided with an automatic feeding apparatus which will feed the workpiece W to be cut after each cutting cycle is completed.

In this connection, it should be noted that the present invention is applicable to any suitable known type of horizontal bandsaw machines, although the invention has been and will be described hereinbefore and hereinafter with regard to the horizontal bandsaw machine 1 in which the saw head assembly 5 carrying the bandsaw blade 11 is swung up and down around the hinge pin 7. For example, the present invention is also applicable to horizontal bandsaw machines in which a cutting head assembly is vertically moved in its entirety along a single or a plurality of vertical guide means such as a post or posts.

In order to detect the bandsaw blade 11 deviating from its proper course and stop the same from moving, there is provided a detecting apparatus 39 which is attached to the guide assembly 21. Alternatively, the detecting apparatus 39 can be mounted in any other suitable manner between the guide assemblies 21 and 23 as will be understood as the description proceeds, although it should preferably be located between the guide assembly 21 and the workpiece W.

Referring to FIGS. 2 and 3, the detecting apparatus includes a base plate member 41 vertically fixed to the left-hand side of the guide assembly 21 by a plurality of bolts 43. An elongate detecting arm member 45, which is provided at its end with a detecting member 46, is pivotally supported on the base plate member 41 by means of a hinge pin 49. The detecting arm member 45 is so disposed as to be rockable on the hinge pin 49 so as to always keep the detecting member 47 in contact with one side of the bandsaw blade 11 and therefore the hinge pin 49 is so disposed as to enable the detecting arm member 45 to swing on and along a plane which is parallel to the surface of the base plate member 41. Thus, the detecting arm member 45 is substantially vertically supported by the hinge pin 49 in parallel with the base plate member 41 and it acts as a lever member having the hinge pin 49 as a supporting point as will be understood as the description proceeds. Also, the detecting member 47 is so formed as to be kept in contact with the bandsaw blade 11 by a smallest area possible, and of course it is preferably of a nature resistant to wear.

As best shown in FIG. 2, there is provided a bell crank member 51 which is pivotally mounted by a hinge pin 53 at the upper portion of the base plate member 41 in contact with the upper end of the detecting arm member 45 in such a manner as to bias the same about the hinge pin 49 to keep the detecting member 47 urged against the bandsaw blade 11. The bell crank member 51 is so arranged as to be urged against the upper end of the detecting arm member 45 by a push member 55 depending from a spool member loosely slidably enclosed in a casing 57 and biased by a spring member 59 toward the bell crank member 51. The spring member 59 is biased between a collar 61 at the end of the push member 55 and a stop 63 adjustably held by an adjusting screw member 65 on a bracket 67 which is fixed to the casing 57. The casing 57 is integrally formed on or fixed to a supporting member 69 which is vertically fixed to the base plate member 41 by a plurality of bolts 71 so that it may hold the push member 55 kept resiliently biased to the bell crank member 51 by the spring member 59. Also, it will be understood that the push member 55 acting as the spool member and the casing 57 will act as a damper for holding the bell crank member 51 resiliently to keep the same from vibrating.

From the above description, it will be understood that the detecting arm member 45 is urged by the spring member 59 by means of the push member 55 and the bell crank member 51 so as to keep the detecting member 47 urged against one side of the bandsaw blade 11. Accordingly, if the bandsaw blade 11 is bent to deviate from its proper course in the direction away from the detecting member 47, the detecting arm member 45 will be rotated around the hinge pin 49 counterclockwise as viewed in FIG. 2 and at the same time the bell crank member 51 will be rotated around the hinge pin 53 downwardly clockwise by the spring member 59 through the push member 55. To the contrary, when the bandsaw blade 11 is bent to deviate against the detecting member 47, the detecting arm member 45 will rotate the bell crank member 51 about the hinge pin 53 clockwise or upwardly against the push member 55 and the spring member 59.

In order to sense the deviations of the bandsaw blade 11 and stop the bandsaw blade 11 together with the entire horizontal bandsaw machine 1, there is provided a sensing and actuating means 73 such as a differential transformer and a magnetic sensor having a sensing member 75 which is disposed in contact with the bell crank member 51 so as to be moved by the same. The sensing and actuating means 73 is so designed as to electrically stop the bandsaw blade 11 together with the entire horizontal bandsaw machine 1 when the sensing member 75 is moved by the bell crank member 51. In the preferred embodiment, the sensing and actuating means 73 is embraced and supported by a supporting member 77 which is integrally formed on the supporting member 69. Thus, it will be now understood that the bandsaw blade 11 is stopped from moving together with the entire horizontal bandsaw machine 1 as soon as the bandsaw blade 11 deviates from its proper course, since the detecting arm member 45 will move the sensing member 75 through the bell crank member 51 when the bandsaw blade 11 is deviating.

As has been thus far described, the detecting member 47, which is provided at the lower end of the detecting arm member 45, is always kept urged into contact with the bandsaw blade 11, and the detecting arm member 45 is connected with the sensing and actuating means 73. Accordingly, as soon as the bandsaw blade 11 begins to deviate from its proper course, the detecting arm member 45 will sensitively and positively detect the deviations of the bandsaw blade 11 and simultaneously will make a signal to the sensing and actuating means 73 to stop the horizontal bandsaw machine 1 and the bandsaw blade 11. The sensing and actuating means 73 can be calibrated to ignore insignificant blade deviations and to react only when such deviations are sufficiently large so as to significantly affect cutting accuracy. Also, since the push member 55 and the casing 57 will act as a damper to dampen or reduce the vibrations of the detecting arm member 45, the deviations of the bandsaw blade 11 can be accurately detected.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A deviation detecting apparatus for a bandsaw blade in a bandsaw machine comprising: arm means pivotally mounted at a location adjacent to the linear path of travel of the blade through the cutting zone; biasing means consisting of a spring-loaded axially movable rod yieldably urging said arm means into slidable contact with one side of said blade, said arm means thus being pivotally movable in response to lateral deviations of said blade from said path; and control means responsive to pivotal movement of said arm means for generating a control signal indicative of said blade deviation.

2. The apparatus of claim 1 wherein one end of said arm means is in slidable contact with the bandsaw blade, and the other end of said arm means is in contact with a pivotal bell crank.

3. The apparatus of claim 2 wherein said control means and said biasing means act on said bell crank.

4. The apparatus of claim 1 wherein said control means includes a sensing member in contact with and movable by said arm means.

* * * * *